United States Patent
Mazzei et al.

(10) Patent No.: US 9,403,573 B1
(45) Date of Patent: Aug. 2, 2016

(54) HOVER BOARD TRICYCLE

(71) Applicants: Angelo L. Mazzei, Bakersfield, CA (US); Javier Bustamante, Bakersfield, CA (US)

(72) Inventors: Angelo L. Mazzei, Bakersfield, CA (US); Javier Bustamante, Bakersfield, CA (US)

(*) Notice: Subject to any disclaimer, the term of this patent is extended or adjusted under 35 U.S.C. 154(b) by 0 days.

(21) Appl. No.: 15/043,364

(22) Filed: Feb. 12, 2016

Related U.S. Application Data

(60) Provisional application No. 62/272,614, filed on Dec. 29, 2015.

(51) Int. Cl.
| | |
|---|---|
| B62K 5/027 | (2013.01) |
| B62D 51/02 | (2006.01) |
| B62D 61/08 | (2006.01) |
| B62H 1/12 | (2006.01) |
| B62K 5/02 | (2013.01) |
| B62K 21/16 | (2006.01) |
| B62K 21/00 | (2006.01) |

(52) U.S. Cl.
CPC . *B62K 5/02* (2013.01); *B62D 51/02* (2013.01); *B62D 61/08* (2013.01); *B62H 1/12* (2013.01); *B62K 5/027* (2013.01); *B62K 21/00* (2013.01); *B62K 21/16* (2013.01)

(58) Field of Classification Search
CPC .......... B62K 5/02; B62K 5/027; B62K 3/007; B62D 51/02; B62D 61/06; B62D 61/065; B62D 61/08; B62H 1/12
USPC ........................................................ 180/210
See application file for complete search history.

(56) References Cited

U.S. PATENT DOCUMENTS

| | | | |
|---|---|---|---|
| 7,407,175 B2 * | 8/2008 | Kamen ................ | B62D 51/02 180/218 |
| D601,922 S | 10/2009 | Imai et al. | |
| 8,225,891 B2 | 7/2012 | Takenaka et al. | |
| 8,738,278 B2 | 5/2014 | Chen | |
| 8,788,096 B1 * | 7/2014 | Sokol ................ | B25J 5/007 280/298 |
| 8,825,254 B2 * | 9/2014 | Kobashi ................ | B62K 3/007 701/22 |
| 2006/0202439 A1 | 9/2006 | Kahlert et al. | |
| 2007/0131461 A1 * | 6/2007 | Treadwell ................ | B62B 5/005 180/19.1 |
| 2008/0029985 A1 | 2/2008 | Chen | |
| 2008/0147281 A1 | 6/2008 | Ishii | |
| 2008/0257617 A1 * | 10/2008 | Yamano ................ | B62D 51/02 180/15 |
| 2009/0032323 A1 | 2/2009 | Kakinuma et al. | |
| 2009/0078485 A1 | 3/2009 | Gutsch et al. | |
| 2009/0105908 A1 | 4/2009 | Casey et al. | |
| 2010/0025139 A1 | 2/2010 | Kosaka et al. | |
| 2010/0121538 A1 | 5/2010 | Ishii et al. | |
| 2010/0222994 A1 | 9/2010 | Field et al. | |
| 2010/0237645 A1 | 9/2010 | Trainer | |
| 2011/0121541 A1 * | 5/2011 | Yamano ................ | B60D 1/00 280/515 |
| 2011/0220427 A1 | 9/2011 | Chen | |
| 2014/0008138 A1 * | 1/2014 | Kim ................ | B62K 3/007 180/216 |
| 2016/0101823 A1 * | 4/2016 | Chang ................ | B62K 5/01 180/6.5 |

FOREIGN PATENT DOCUMENTS

CN 104029769 9/2014

* cited by examiner

*Primary Examiner* — Keith Frisby
(74) *Attorney, Agent, or Firm* — James M. Duncan, Esq.; Klein DeNatale Goldner

(57) ABSTRACT

An improvement to a hover board provides additional support and balance to an operator of the hover board. The improvement converts a two wheeled hover board, having no structure for an operator to hold onto with the operator's hands, into a three wheeled vehicle with a handle to which an operator may hold onto. A platform member couples to the hover board, while still allowing the hover board controls to function. A handle member extends upwardly from the platform member as a handle. A third wheel depends from the underside of the platform member, where the third wheel provides additional stability.

20 Claims, 15 Drawing Sheets

HOVER BOARD TRICYCLE

U.S. Application No. 62/272,614 for this invention was filed on Dec. 29, 2015, for which application these inventors claims domestic priority, and which application is incorporated in its entirety.

BACKGROUND OF THE INVENTION

The present invention relates to powered vehicles in which the operator is standing upon the vehicle and the vehicle is controlled by a user's feet. The present invention more particularly relates to providing a powered vehicle which is controlled by a user's feet but which, in contrast to self-balancing vehicles having only two wheels, embodiments of the present invention have an additional wheel for providing support and assisting a user in balancing the vehicle. The present invention further relates to modifying a self-balancing two-wheeled vehicle to provide additional support and facilitate an operator to operate such vehicle with reduced practice time and with reduction of the risk of falling off the device.

U.S. Pat. No. 8,738,278 teaches a two-wheeled, self-balancing vehicle having two platform sections which are independently moveable with respect to one another and which provides independent control and/or drive of the wheel associated with a given platform section. The boards are operated by leaning forward to go forward, leaning backward to reverse, pointing left toes downward to turn right and to point right toes downward to turn left. There is a variety of these devices available to the consumer which have a number of different names, such as Powerboard, hover board, self-balancing scooter, gyro board, etc. These devices are hereinafter collectively referred to a "hover boards." Unlike a previous two-wheeled platform-type vehicle—the Segway—the hover board is sufficiently compact that the devices can be packed into a locker or duffle bag. The devices are capable of propelling the operator along at a speed of up to ten miles per hour. The devices are frequently seen at airports, shopping malls, and elsewhere.

There is growing demand for hover boards because the devices are fun and provide an easily portable and relatively inexpensive mode of transportation. However, there are drawbacks to the devices. Riding the board successfully requires the operator to balance, which requires a relatively significant amount of core abdominal strength. If someone has a weak core or weak set of abdominal muscles, there is an increased risk of falling forward or backward, which can cause elbow fractures, ankle injuries, wrist fractures and potential impacts to the head and face. The boards can also present a collision hazard for pedestrians. A need exists to facilitate an operator to learn to ride a hover board in a safe manner. In addition, because some operators may never develop sufficient core strength to safely ride a hover board, an apparatus which facilitates the riding of a hover board should retain the same features which make the hover board appealing, specifically the portability of the device.

SUMMARY OF THE INVENTION

Embodiments of the present invention, when used in combination with hoverboards, provide a solution to the above-identified need. Embodiments of the present invention comprise a hover board where the hover board has a first foot placement section and a second foot placement section. The first foot placement section and the second foot placement section are coupled to one another and are independently movable with respect to one another. A first wheel is associated with the first foot placement section and a second wheel is associated with the second foot placement section. The first and second wheels are spaced apart and substantially parallel to one another. The hover board has a first position sensor and a first drive motor configured to drive the first wheel. Similarly, the hover board has a second position sensor and a second drive motor configured to drive the second wheel.

In addition to the hover board, embodiments of the invention have a platform member which has a first end which attaches to the approximate middle of a hover board and a second end which cantilevers forward from the hover board. The second end of the platform member has a bottom side from which depends a ground engaging wheel or roller. The second end of the platform member has a top side from which extends a handle member which extends upwardly a sufficient length to be grasped by a person standing upon the hover board.

The platform member may be coupled to the hover board by a front u-block which is attached to a rear u-block, the front u-block and the rear u-block attached in opposite-facing relation, wherein an opening is defined between the attached u-blocks and a portion of the hover board is disposed within the opening and sandwiched between the u-blocks.

Alternatively, the platform member may be coupled to the hover board by a pair of u-bolts, wherein each u-bolt comprises a pair of threaded arms protruding from a curved base and the threaded arms extend into a downwardly facing vertical plate and the curved base of each u-bolt is disposed about a portion of the hover board.

DETAILED DESCRIPTION OF THE INVENTION

Referring now to the figures, FIGS. 1-8 show a first embodiment of the presently disclosed hover board tricycle 10. Embodiments of the invention comprise a cantilevering wheel/handle assembly 20 which attaches about the midsection of a hover board 100.

Figure 1:
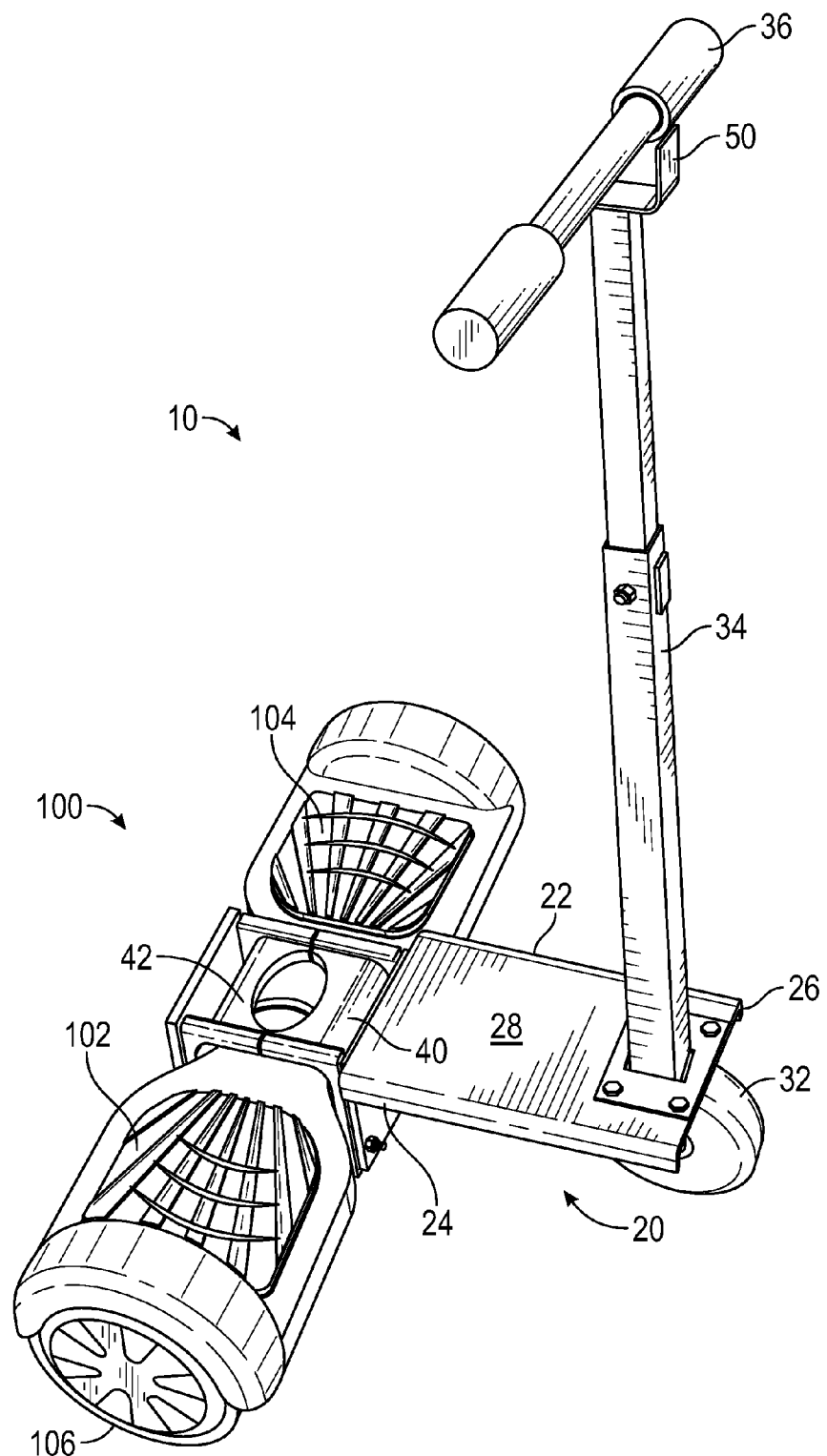
FIG. 1 shows a perspective view of an embodiment of the present invention.
Figure 2:
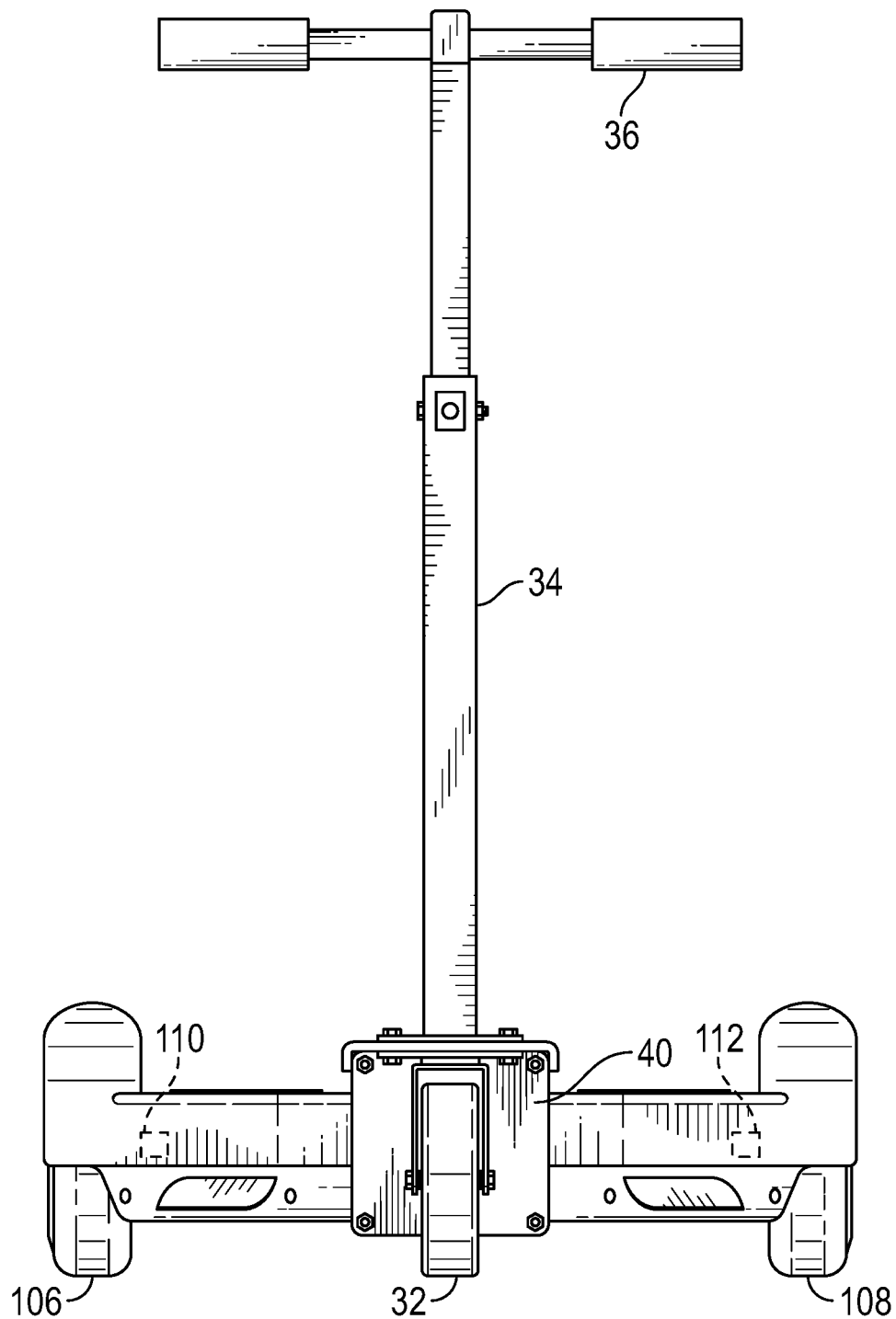
FIG. 2 shows a front view of an embodiment of the present invention.
Figure 3:
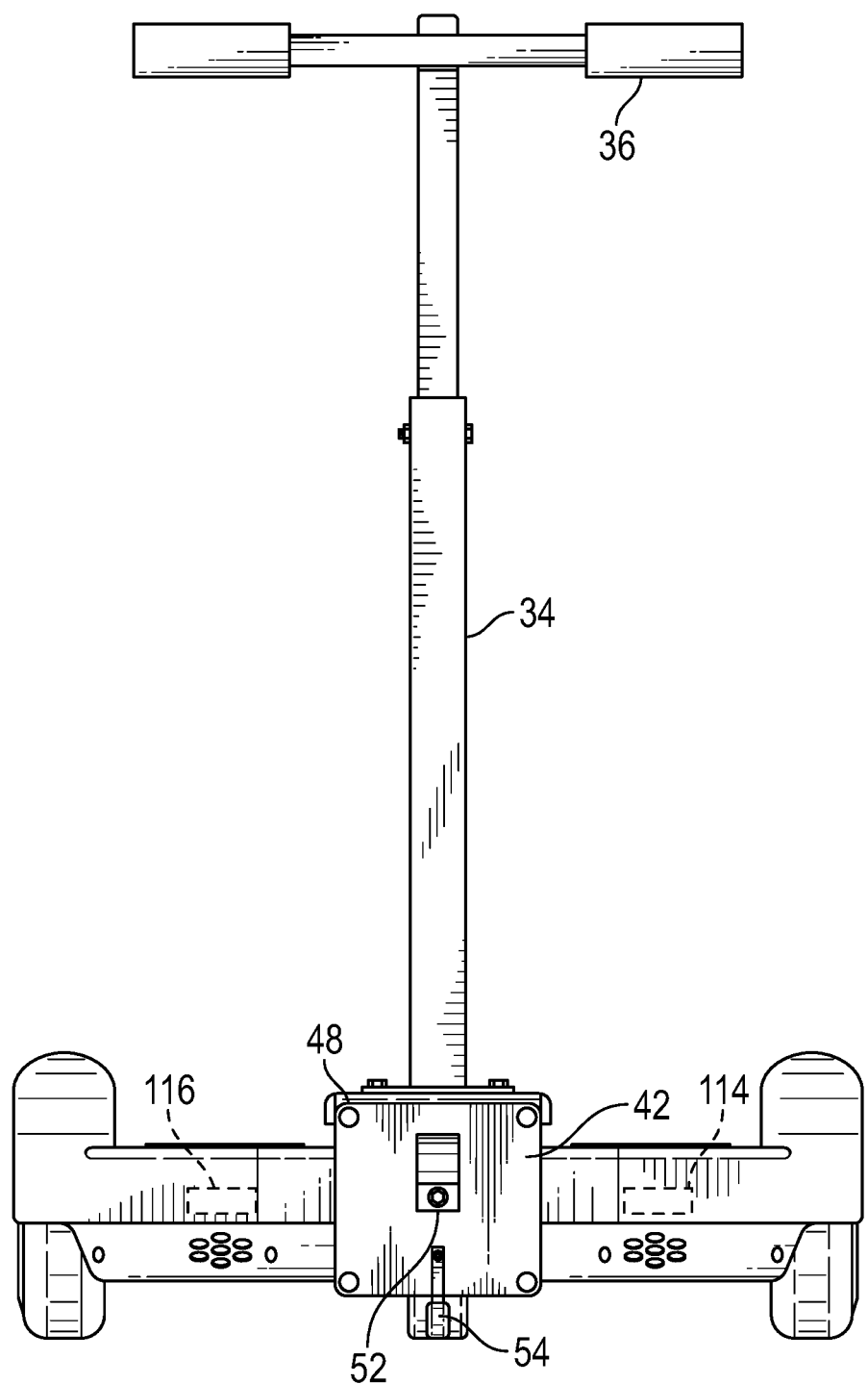
FIG. 3 shows a rear view of an embodiment of the present invention.
Figure 4:
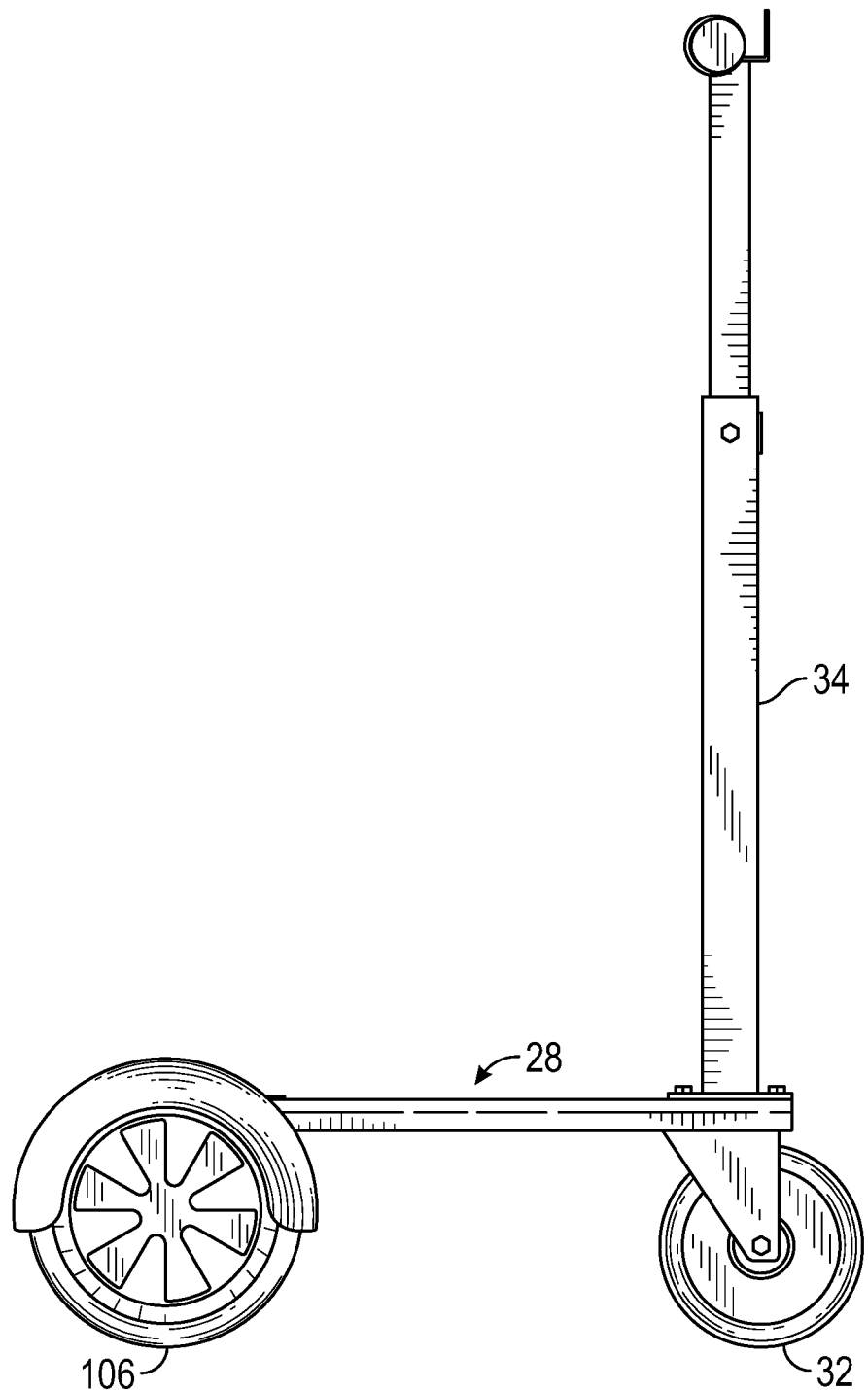
FIG. 4 shows a right side view of an embodiment of the present invention.
Figure 5:
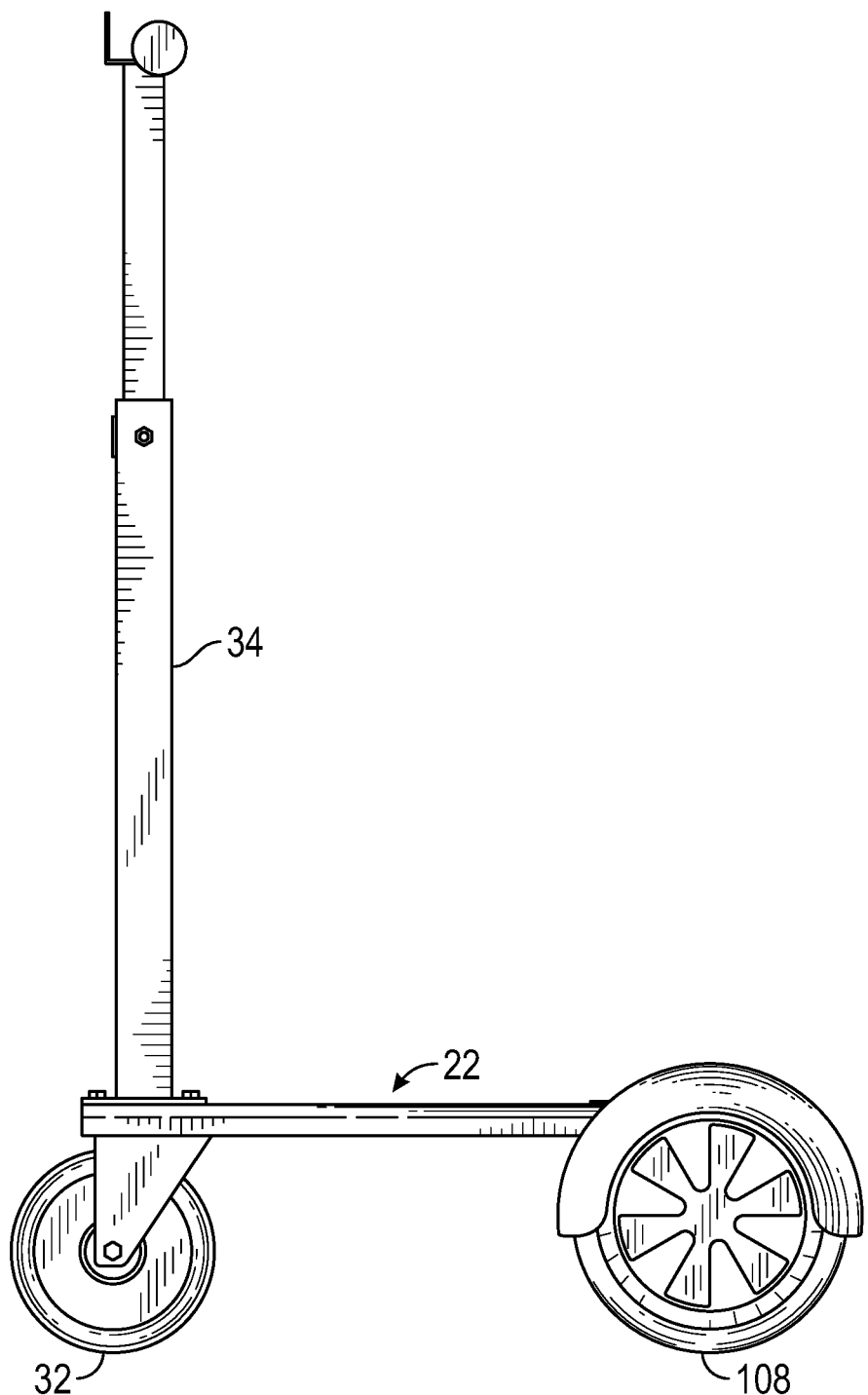
FIG. 5 shows a left side view of an embodiment of the present invention.
Figure 6:
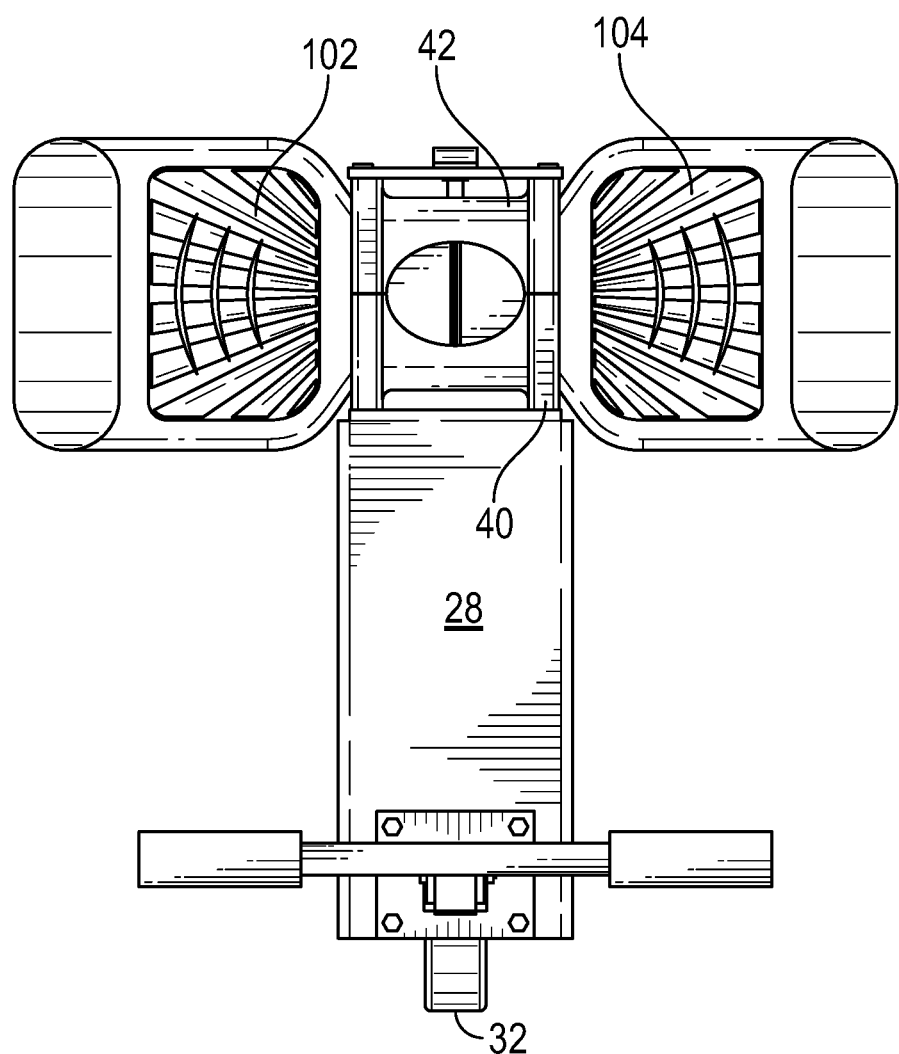
FIG. 6 shows a top view of an embodiment of the present invention.
Figure 7:
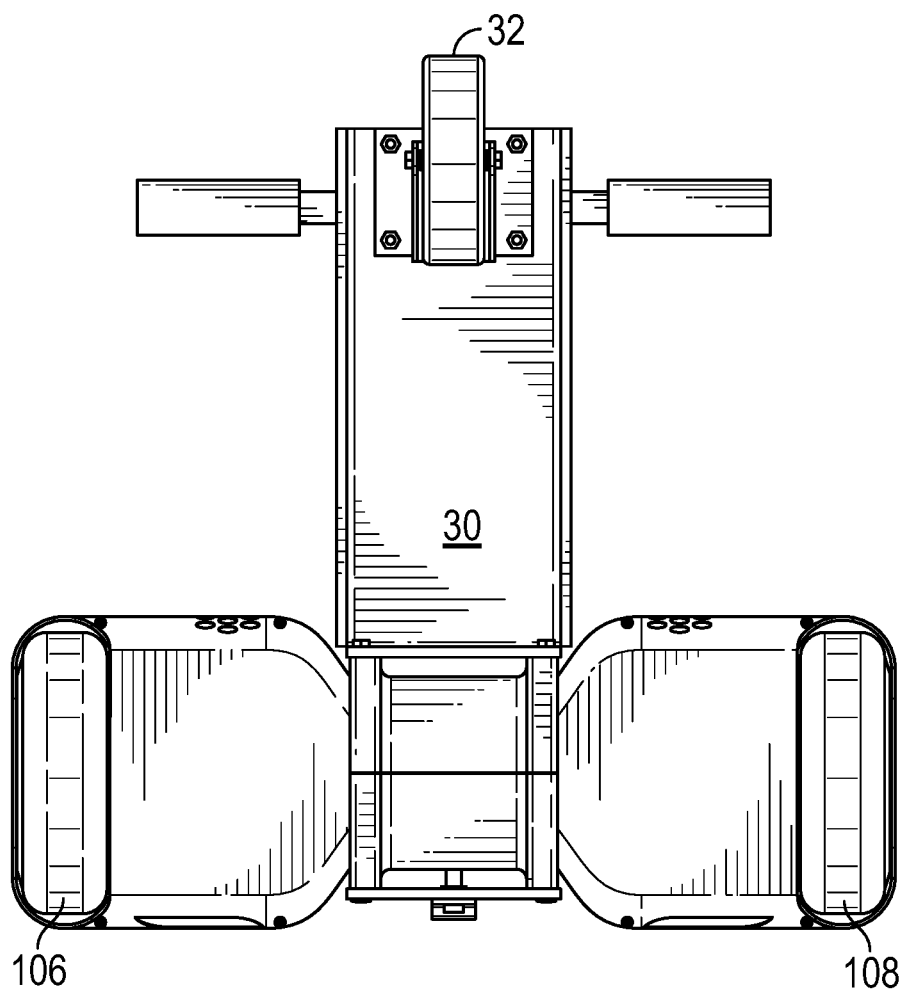
FIG. 7 shows a bottom view of an embodiment of the present invention.

It is to be understood that the term "hover board" as used herein includes all of the devices which generally comprise a first foot placement section 102 and a second foot placement section 104 which are coupled to one another and are independently movable with respect to one another. The hover board 100 further has a first wheel 106 associated with the first foot placement section 102 and a second wheel 108 associated with the second foot placement section 104. The first wheel 106 and the second wheel 108 are spaced apart and substantially parallel to one another. The hover board 100 further comprises a first drive motor 110 configured to drive the first wheel 106 and a second drive motor 112 is configured to drive the second wheel 108 as schematically shown in FIG. 2. As schematically shown in FIG. 3, a first position sensor 114, which may be a gyroscopic sensor, is mounted on a circuit board and provides measurement of the orientation of first foot placement section 102. Likewise, second position sensor 116 is mounted on a circuit board and provides measurement of the orientation of the second foot placement section 104. The terms "forward", "upward", "downward", etc., refer to the direction with respect to the position of the hover board in a riding position.

Cantilevering wheel/handle assembly 20 generally comprises a platform member 22, a ground engaging wheel 32, and handle member 34.

Platform member 22 has a first end 24 and a second end 26. Platform member 22, which may be manufactured from a rectangular piece of steel plate, has a top 28 and a bottom 30. Platform member 22 cantilevers horizontally forward from hover board 100, where first end 24 is coupled to the hover board 100. At the second end 26 of platform member 22, ground engaging wheel 32 depends from bottom 30 and provides a third contact point with the ground in addition to the two wheels 106, 108 of the hover board 100. This configuration transforms the two wheeled hover board 100 to a three wheeled vehicle or tricycle and provides additional stability. Ground engaging wheel 32 will typically be of the plate-mounted caster type as shown in the figures, with a rubber wheel, although other wheel substances such as polyurethane, pneumatic, or polyolefin wheels may also be used. Ground engaging wheel 32 may also be a roller. The wheel 32 will typically be of the swivel self-turning type.

Handle member 34 extends upwardly from the top 28 of the second end 26 of the platform member 22. The handle member 34 is of a sufficient length to be grasped by a person standing upon the hover board 100, which means the handle member 34 will typically have a length of at least thirty inches, or the handle member 34 may be of a telescoping type, as shown in FIG. 1-8 which adjusts to the height of the user, whether child or adult. As shown in the figures, handle member 34 may have a tee grip 36. Alternatively, the handle member may be a straight vertical post. Handle member 34 may also have optional bag hook 50 to which an operator may hang a purse, handbag, grocery bag, etc.

Platform member 22 may be coupled to hover board 100 in a variety of manners so long as the platform member is sufficiently attached to prevent significant pivoting of the platform member about the hover board. However, it is to be appreciated that the coupling of platform member 22 to hover board 100 must allow first foot placement member 102 to be independently movable with respect to second foot placement member 104. Typically, adapter brackets and fasteners will be utilized. Because of the different dimensions of the various hover boards, it is desirable to have a coupling mechanism which is universal, such as that shown for the embodiments shown in the figures, which allows sufficient independent movement of the first foot placement member 102 with the second foot placement member 104.

Figure 8:
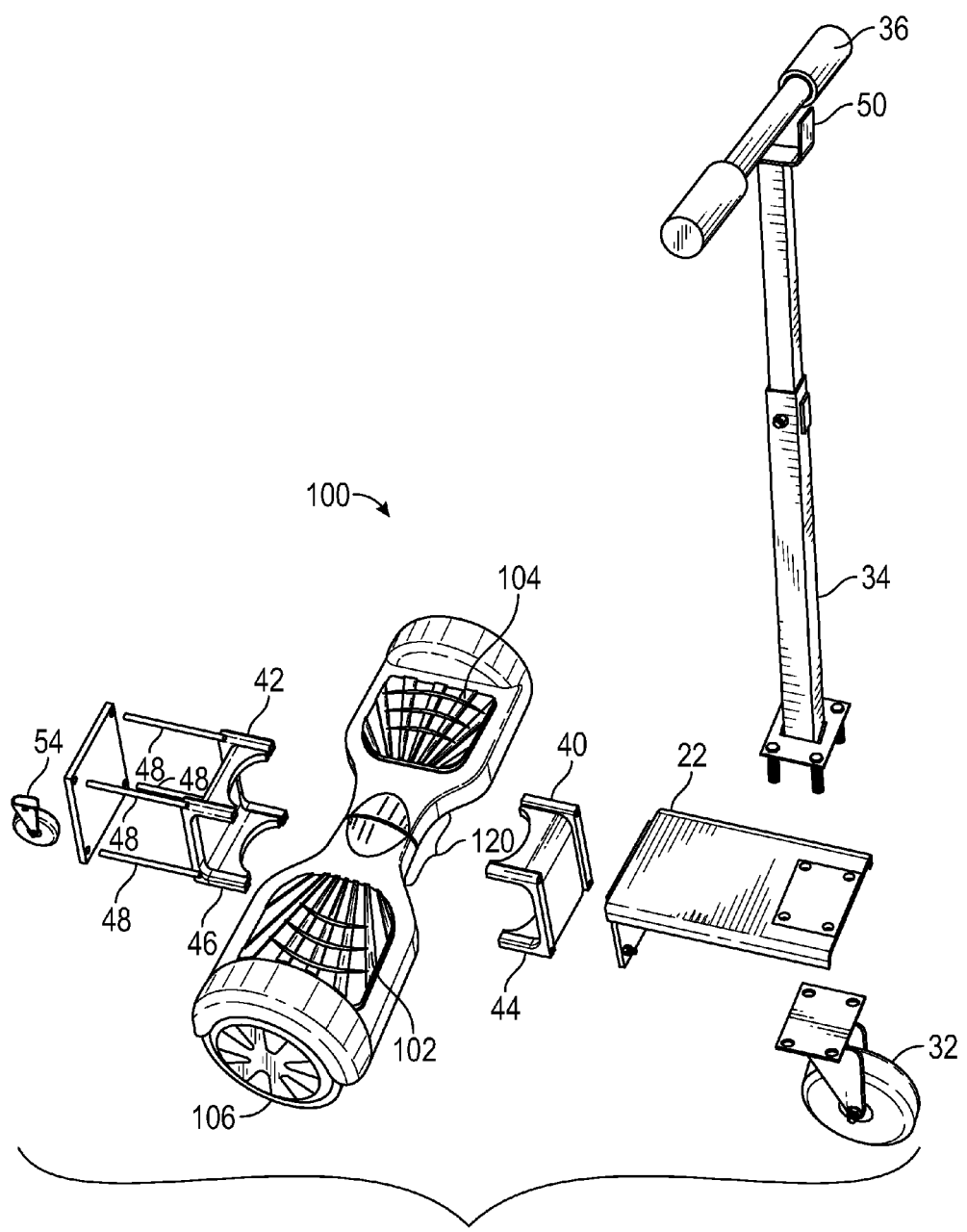
FIG. 8 shows a partial exploded view of an embodiment of the present invention.
Figure 9:
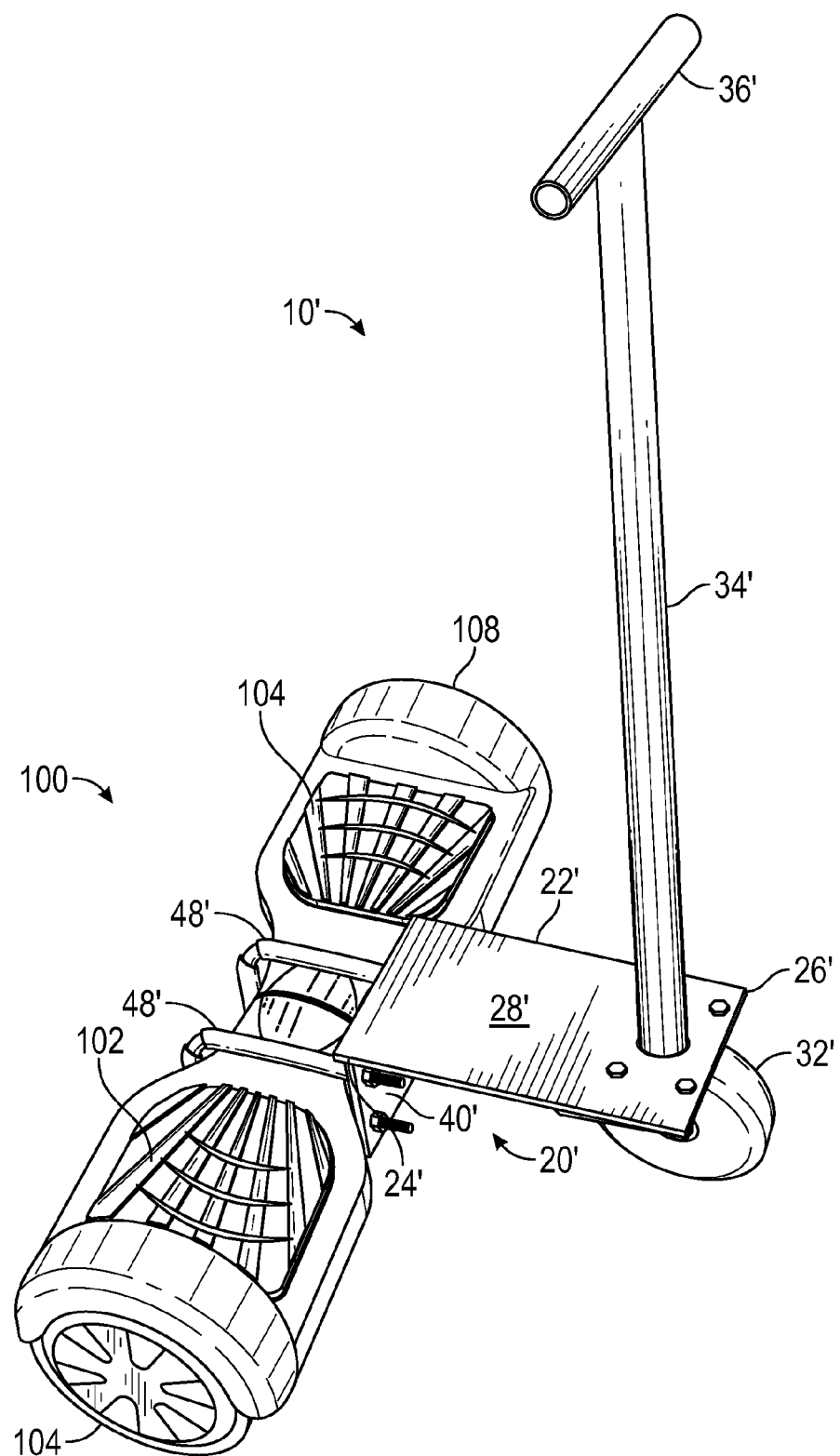
FIG. 9 shows a perspective view of a second embodiment of the present invention.
Figure 10:
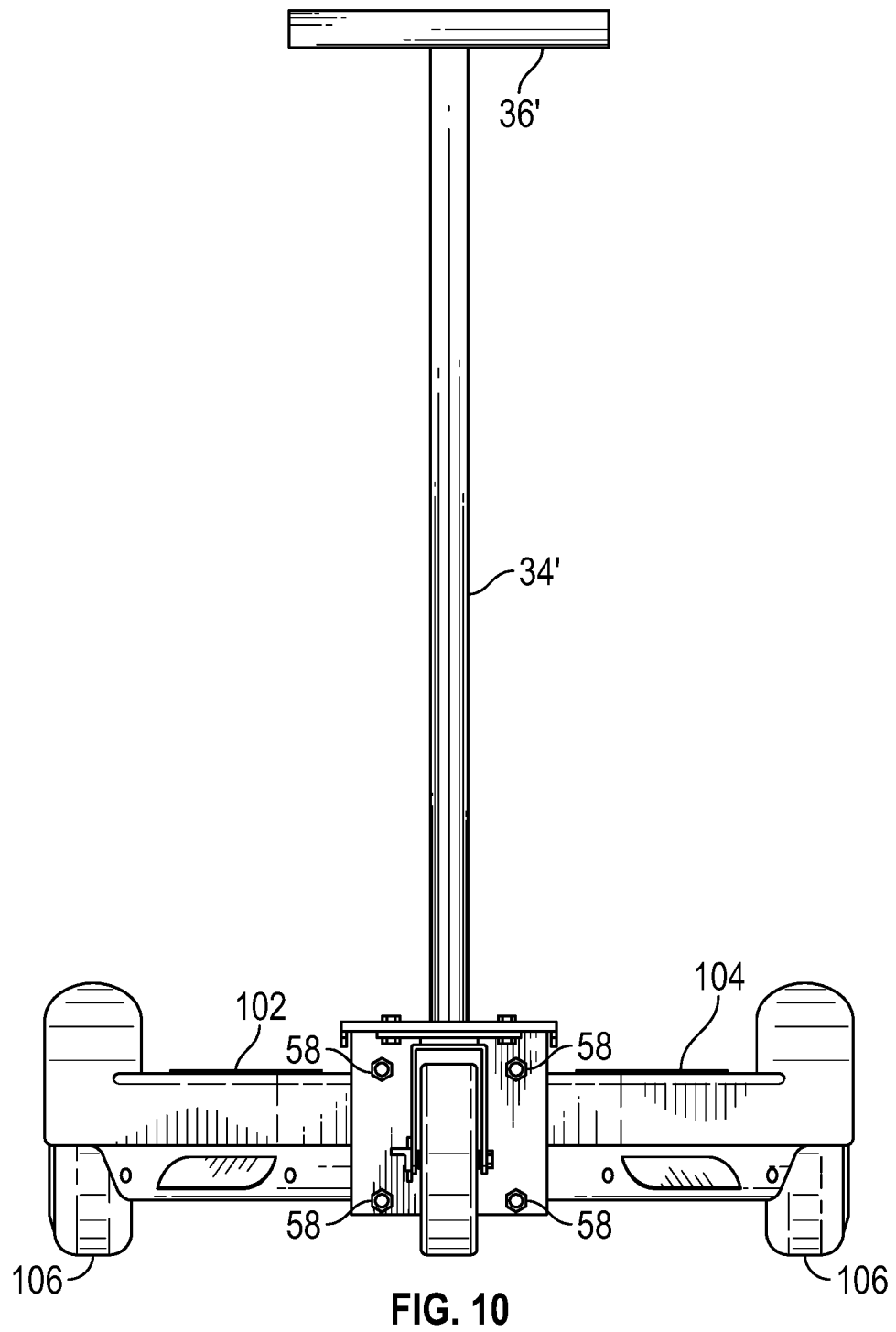
FIG. 10 shows a front view of the second embodiment of the present invention.
Figure 11:
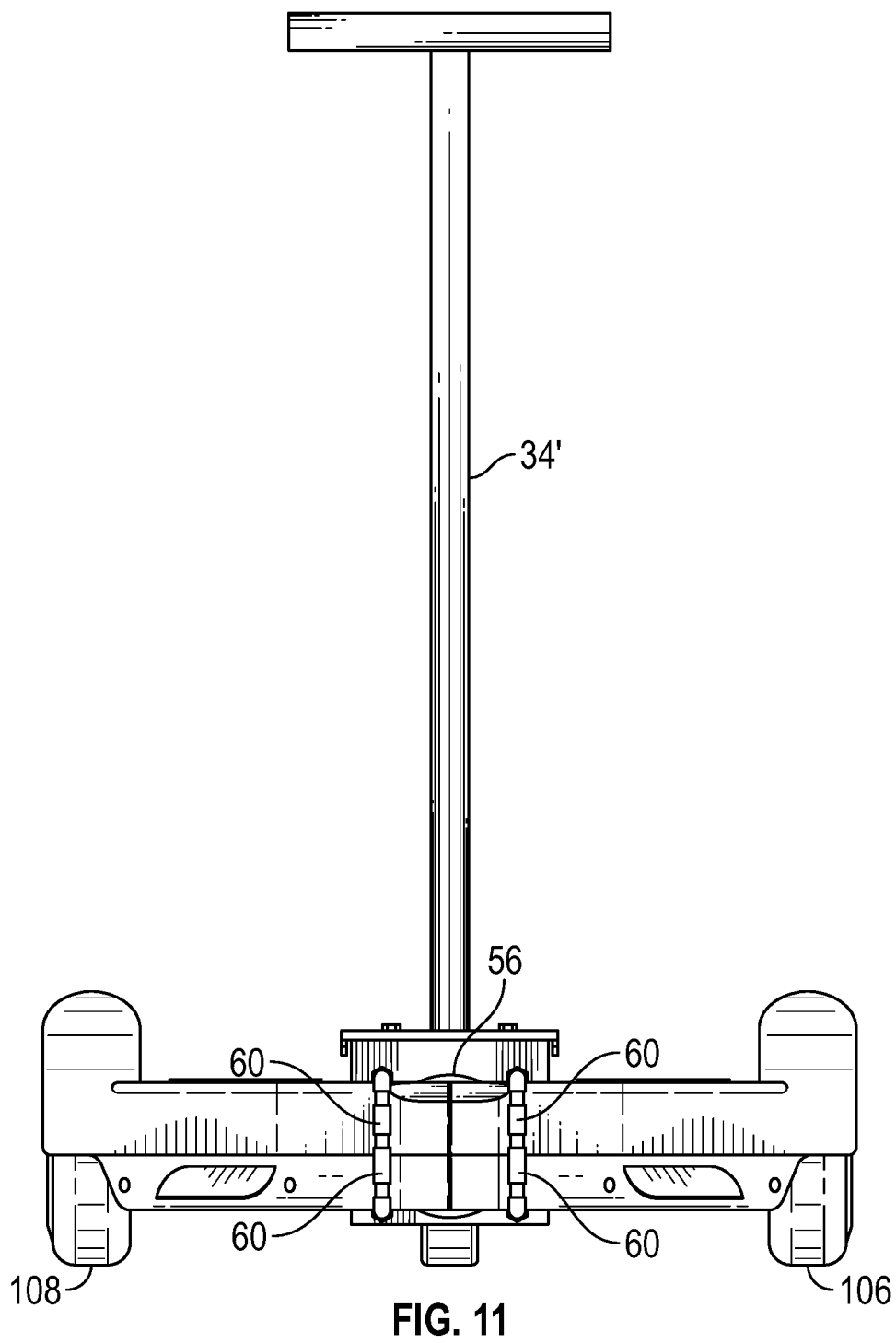
FIG. 11 shows a rear view of the second embodiment of the present invention.
Figure 12:
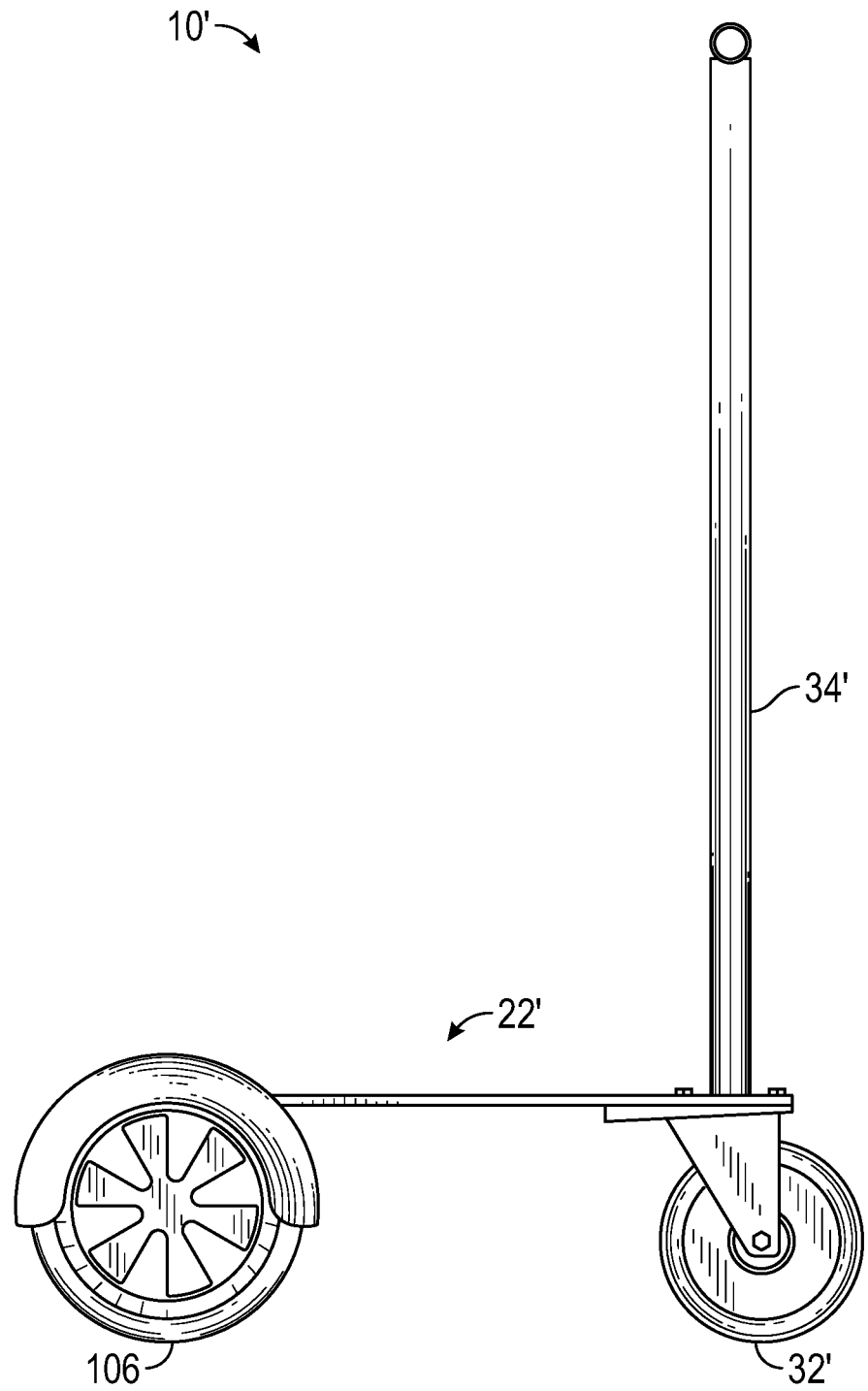
FIG. 12 shows a right side view of the second embodiment of the present invention.
Figure 13:
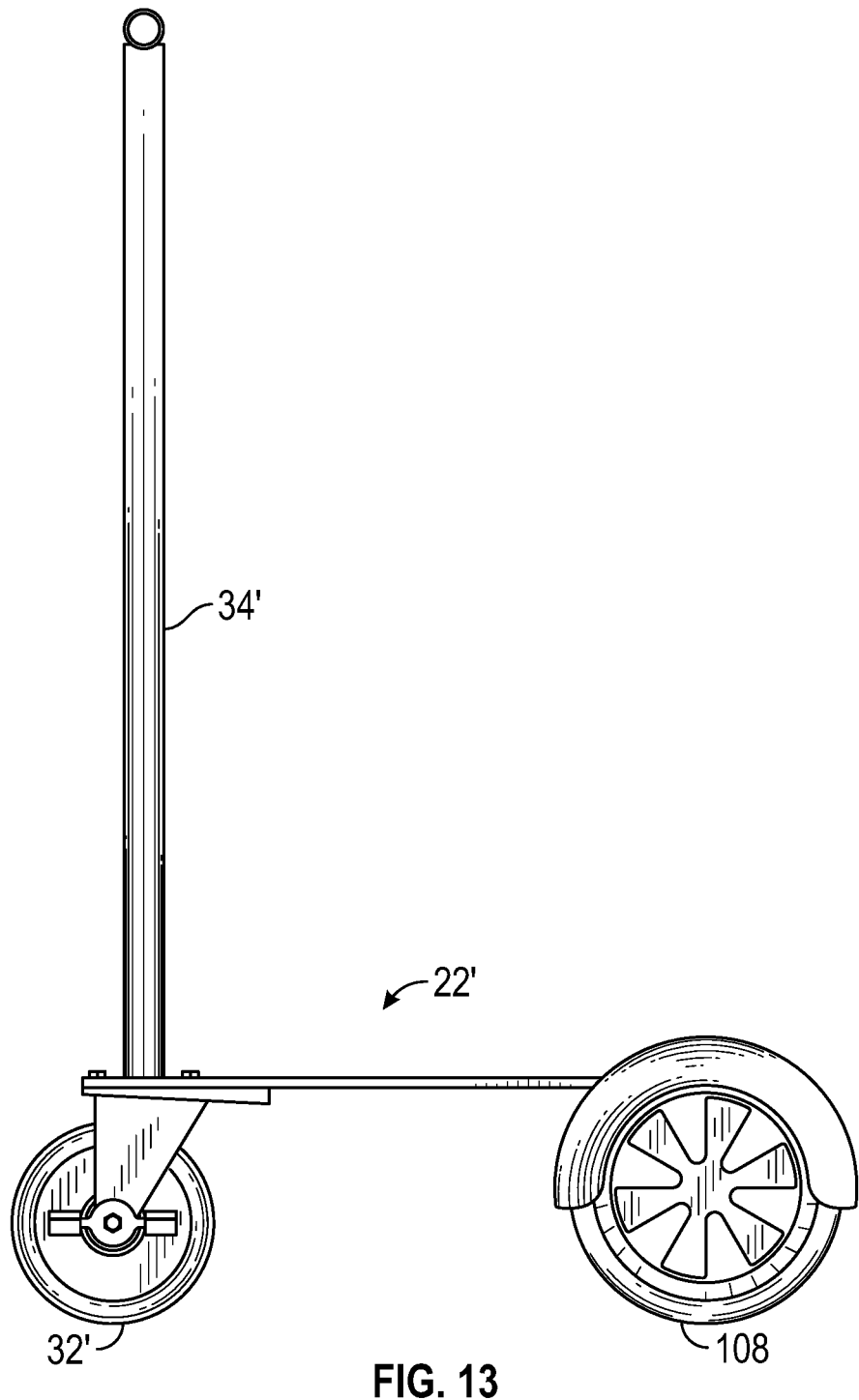
FIG. 13 shows a left side view of the second embodiment of the present invention.
Figure 14:
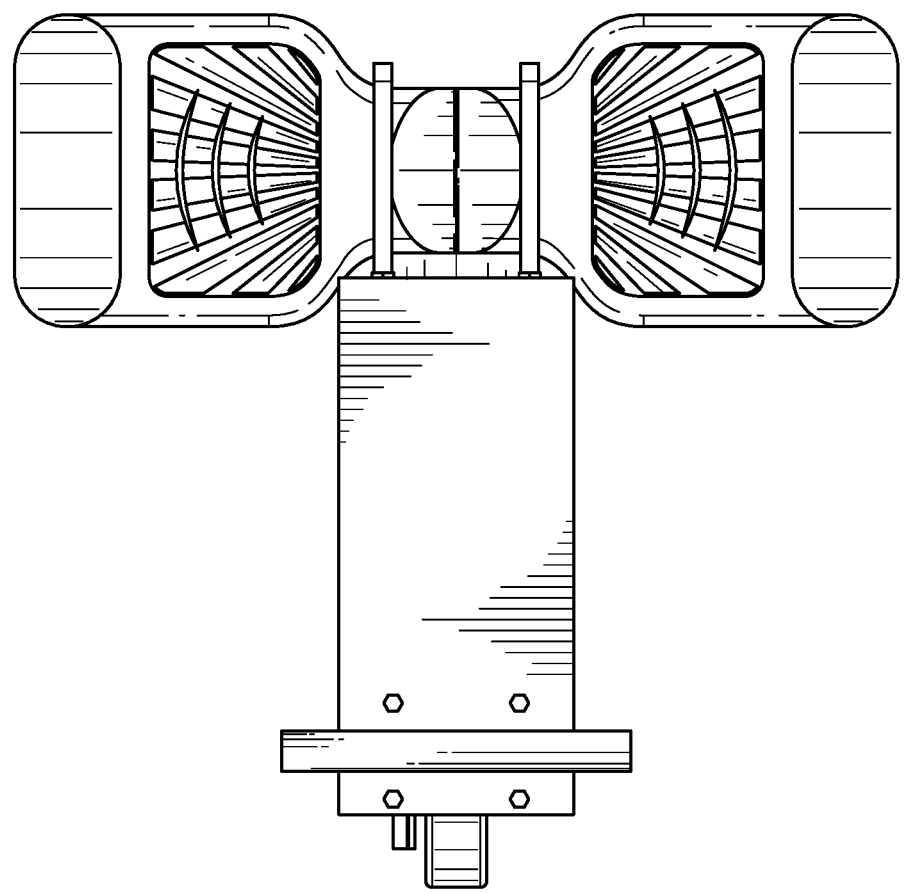
FIG. 14 shows a top view of the second embodiment of the present invention.
Figure 15:
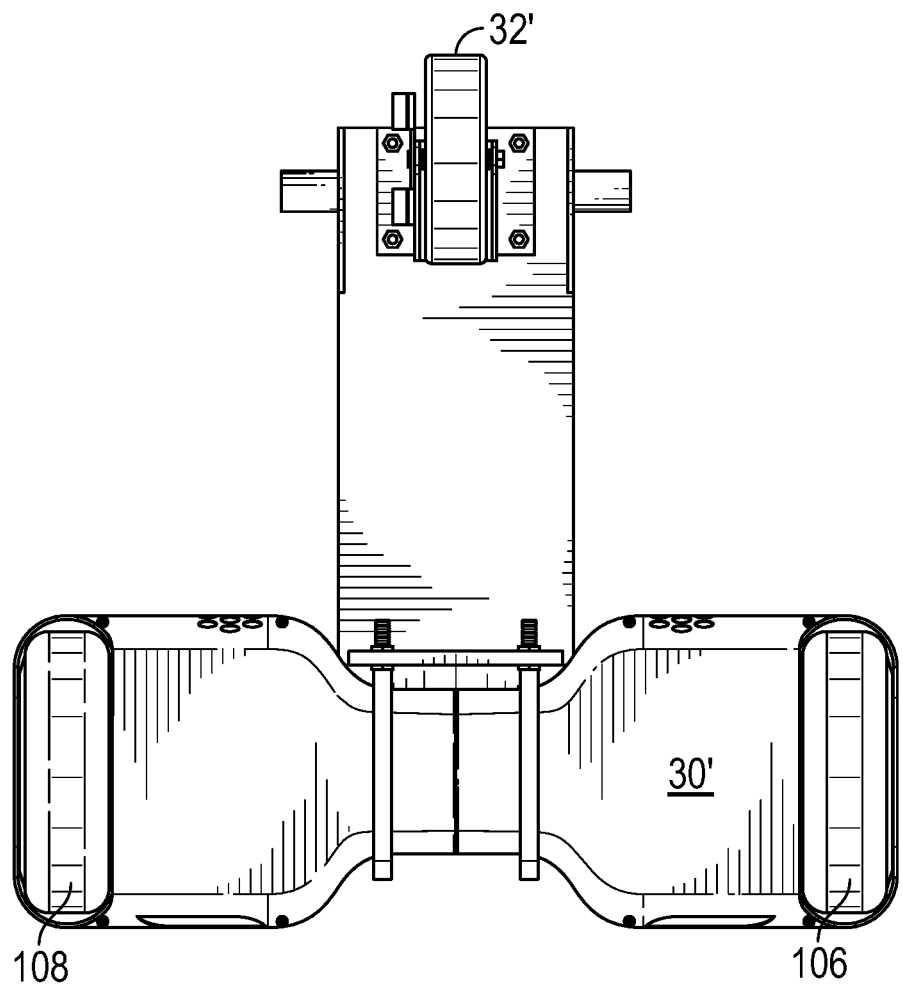
FIG. 15 shows a bottom view of the second embodiment of the present invention.

For the embodiment of the hover board tricycle 10 shown in FIGS. 1-8, the platform member 22 is coupled to the hover board 100 by a front u-block 40 which is attached to a rear u-block 42. The front u-block 40 and the rear u-block 42 are attached in opposite-facing relation, as best shown in FIG. 8. As further shown in FIG. 8, an opening is defined between the points of attachment 44, 46 of front u-block 40 and rear u-block 42 where fasteners 48 are utilized to attach the front u-block and the rear u-block together. A portion 120 of the hover board 100 is disposed within the opening with the portion of the hover board sandwiched between the u-blocks 40, 42 when the u-blocks are attached together with fasteners 48.

Embodiments of the hover board tricycle 10 may have an optional trailer hitch 52 which attaches to a backward facing side of rear u-block 42. Trailer hitch 52 may be utilized for connecting a small trailer, such as a wheeled child or pet carrier, or a utility trailer for transporting groceries, tools, etc. Embodiments of the hover board tricycle 10 may further have an optional rear wheel 54 which also attaches to a backward facing side of rear u-block 42. The optional rear wheel 54 provides additional stability and support which assists the operator from falling over backwards.

For the embodiment of the hover board tricycle 10' shown in FIGS. 9-15, the apparatus comprises a cantilevering wheel/handle assembly 20' which attaches about the mid-section of a hover board 100, which may be identical to the hover board described for the embodiment 10 discussed above. Cantilevering wheel/handle assembly 20' generally comprises a platform member 22', a ground engaging wheel 32', and handle member 34'.

Platform member 22' has a first end 24' and a second end 26'. Platform member 22', which may be manufactured from a rectangular piece of steel plate, has a top 28' and a bottom 30'. Platform member 22' cantilevers horizontally forward from hover board 100, where first end 24' is coupled to the hover board 100. At the second end 26' of platform member 22', ground engaging wheel 32' depends from bottom 30' and provides a third contact point with the ground in addition to the two wheels 106, 108 of the hover board 100. Ground engaging wheel 32' will typically be of the plate-mounted caster type as shown in the figures, with a rubber wheel, although other wheel substances such as polyurethane, pneumatic, or polyolefin wheels may also be used. Ground engaging wheel may also be a roller. The wheel 32' will typically be of the swivel self-turning type.

Handle member 34' extends upwardly from the top 28' of the second end 26' of the platform member 22'. The handle member 34' is of a sufficient length to be grasped by a person standing upon the hover board 100, which means the handle member 34' will typically have a length of at least thirty inches, or the handle member 34' may be of a telescoping type which adjusts to the height of the user, whether child or adult. As shown in the figures, handle member 34' may have a tee grip 36.' Alternatively, the handle member may be a straight vertical post.

As with the embodiment described above, platform member 22' may be coupled to hover board 100 in a variety of manners so long as the platform member is sufficiently attached to prevent significant pivoting of the platform member about the hover board. However, it is to be appreciated that the coupling of platform member 22' to hover board 100 must allow first foot placement member 102 to be independently movable with respect to second foot placement member 104. Typically, adapter brackets and fasteners will be utilized. Because of the different dimensions of the various hover boards, it is desirable to have a coupling mechanism which is universal, such as that shown for the embodiments shown in the figures, which allows sufficient independent movement of the first foot placement member 102 with the second foot placement member 104.

For the embodiment of the hover board tricycle 10' shown in FIGS. 9-15, the platform member 22' has a downwardly facing vertical plate 40' at the first end 24'. A cushion member 56 may be disposed between the downwardly facing vertical plate 40' and the front edge of the hover board 100 to occupy any space between the platform member 22' and the hover board 100. U-bolts 48' may be utilized to attach hover board 100 to the platform member 22' as shown for the embodiment shown in FIGS. 9-15. U-bolts 48' may have a curved base which is disposed about a portion of the hover board 100, with threaded arms which extend into the downwardly facing vertical plate 40' and held by nuts 58. U-bolts 48' may have cushioned sleeves 60 which prevent damage to the hover board 100. The use of cushion member 56 along with the adjustable u-bolts 48' makes the embodiment of the platform member 22' adjustable for fitting many different dimensions and shapes of hover boards.

The platform members 22, 22' disclosed herein provide a conversion kit for improving a hover board 100 by converting a hover board into a tricycle.

While the above is a description of various embodiments of the present invention, further modifications may be employed without departing from the spirit and scope of the present invention. Thus the scope of the invention should not be limited according to these factors, but according to the following appended claims.

What is claimed is:

1. A vehicle device, comprising:
a hover board comprising a first foot placement section and a second foot placement section that are coupled to one another and are independently movable with respect to one another; a first wheel associated with the first foot placement section and a second wheel associated with the second foot placement section, the first and second wheels being spaced apart and substantially parallel to one another; a first position sensor and a first drive motor configured to drive the first wheel, a second position sensor and a second drive motor configured to drive the second wheel;
a platform member having a first end and a second end, a top and a bottom, wherein the first end is coupled to the hover board and the second end cantilevers horizontally forward from the hover board wherein the coupling of the platform member to the hover board allows the first foot placement section and the second foot placement section to be independently movable with respect to one another;
a ground engaging wheel depending from the bottom at the second end; and
a handle member extending upwardly from the top at the second end, the handle member having a sufficient height to be grasped by a person standing upon the hover board.

2. The vehicle device of claim 1 wherein the platform member is coupled to the hover board by a front u-block which is attached to a rear u-block, the front u-block and the rear u-block attached in opposite-facing relation, wherein an opening is defined between the attached u-blocks and a portion of the hover board is disposed within the opening and sandwiched between the u-blocks.

3. The vehicle device of claim 2 wherein the rear u-block comprises a backward face and a towing hook extends from the backward face.

4. The vehicle device of claim 2 wherein the rear u-block comprises a backward face and a rear wheel extends from the backward face.

5. The vehicle device of claim 1 wherein the platform member is coupled to the hover board by a pair of u-bolts, wherein each u-bolt comprises a pair of threaded arms protruding from a curved base and the threaded arms extend into a downwardly facing vertical plate and the curved base of each u-bolt is disposed about a portion of the hover board.

6. The vehicle device of claim 1 wherein the height of the handle member is adjustable.

7. The vehicle device of claim 1 wherein the handle member comprises a tee-handle.

8. The vehicle device of claim 1 wherein the handle member comprises a utility hook.

9. In combination with a vehicle device of the type having a first foot placement section and a second foot placement section that are coupled to one another and are independently movable with respect to one another, a first wheel associated with the first foot placement section and a second wheel associated with the second foot placement section, the first and second wheels being spaced apart and substantially parallel to one another, a first position sensor and a first drive motor configured to drive the first wheel, a second position sensor and a second drive motor configured to drive the second wheel, an improvement comprises:
a platform member having a first end and a second end, a top and a bottom, wherein the first end is coupled to the first foot placement section and to the second foot placement section and the second end cantilevers horizontally forward from the first end wherein the coupling of the platform member to the first foot placement section and to the second foot placement section allows the first foot placement section and the second foot placement section to be independently movable with respect to one another;
a ground engaging wheel depending from the bottom at the second end; and
a handle member extending upwardly from the top at the second end, the handle member having a sufficient height to be grasped by a person standing upon the first foot placement section and the second foot placement section.

10. The improvement of claim 9 wherein the platform member is coupled to the first foot placement section and to the second foot placement section by a front u-block which is attached to a rear u-block, the front u-block and the rear u-block attached in opposite-facing relation, wherein an opening is defined between the attached u-blocks and a portion of the first foot placement section and a portion of the second foot placement section is disposed within the opening and sandwiched between the u-blocks.

11. The improvement of claim 9 wherein the platform member is coupled to the first foot placement section and to the second foot placement section by a pair of u-bolts, wherein each u-bolt comprises a pair of threaded arms protruding from a curved base and the threaded arms extend into a downwardly facing vertical plate and the curved base of each u-bolt is disposed about a portion of the hover board.

12. In a hover board of the type comprising a first foot placement section and a second foot placement section that are coupled to one another and are independently movable with respect to one another, a first wheel associated with the first foot placement section and a second wheel associated with the second foot placement section, the first and second wheels being spaced apart and substantially parallel to one another, a first position sensor and a first drive motor configured to drive the first wheel, a second position sensor and a second drive motor configured to drive the second wheel, a conversion kit for modifying the hover board to a tricycle, the conversion kit comprising:

a platform member having a first end coupled to the hover board and a second end which extends horizontally from the hover board, wherein the coupling of the platform member to the hover board allows the first foot placement section and the second foot placement section to be independently movable with respect to one another, the second end having a top and a bottom; and a ground engaging wheel depending from the bottom of the second end.

13. The conversion kit of claim 12 further comprising a handle member extending upwardly from the top of the second end to a height.

14. The conversion kit of claim 13 wherein the height of the handle member is adjustable.

15. The conversion kit of claim 13 wherein the handle member comprises a tee-handle.

16. The conversion kit of claim 13 wherein the handle member comprises a utility hook.

17. The conversion kit of claim 12 wherein the first end comprises a downwardly facing vertical plate adjacent to the hover board.

18. The conversion kit of claim 17 wherein a cushion member is disposed between the downwardly facing vertical plate and the hover board.

19. The conversion kit of claim 17 wherein the platform member is coupled to the hover board by a pair of u-bolts, wherein each u-bolt comprises a pair of threaded arms protruding from a curved base and the threaded arms extend into the downwardly facing vertical plate and the curved base of each u-bolt is disposed about a portion of the hover board.

20. The conversion kit of claim 12 wherein the platform member is coupled is to the first foot placement section and to the second foot placement section board by a front u-block which is attached to a rear u-block, the front u-block and the rear u-block attached in opposite-facing relation, wherein an opening is defined between the attached u-blocks and a portion of the first foot placement section and a portion of the second foot placement section is disposed within the opening and sandwiched between the u-blocks.

* * * * *